United States Patent Office 2,865,754
Patented Dec. 23, 1958

2,865,754
TENDERIZER FOR MEATS AND VEGETABLES
Henry Doroba, Chicago, Ill.
No Drawing. Application September 18, 1956
Serial No. 610,669
3 Claims. (Cl. 99—1)

This invention relates to the preparation of foods for human consumption.

Certain cuts of meats and certain meats are usually always tough. The same is true of certain vegetables also.

It is an object of this invention to provide a preparation that can be applied to tough meats and vegetables so as to soften them and make them more edible.

It is the purpose of the inventor to provide a tenderizer for meats and vegetables for human consumption.

There are meat tenderizers already on the market. But there are objections to their use. Either they are too costly, or impart a taste or flavor to the meat that is not desirable, or they destroy the true flavor of the meat being tenderized.

The tenderizer of this invention comprises a combination of ingredients that are inexpensive and some of which are universally acknowledged and accepted as flavoring materials for both meats and vegetables. These features make the tenderizer of this invention not only generally acceptable as such, but also as a flavoring material for soups while at the same time tenderizing the vegetables in the soup.

Thus, it both tenderizes and flavors, but its flavoring ingredients are not the heavy strong type. Rather they are light and delicate so that they do not destroy the natural flavor of the meats or vegetables being tenderized.

Another feature of the tenderizer of this invention is that it is very economical in that it is inexpensive to make and also relatively small amounts of the tenderizing powder are required to soften meats and vegetables.

Further, addition of a small amount of the tenderizing powder to the water when cooking vegetables will decrease the cooking time primarily because it softens the vegetables. This feature lessens the amount of cooking fuel and time required.

In a specific embodiment this invention comprises a powdered combination of ingredients which when sprinkled on tough meats and vegetables softens them and makes them more edible.

In the case of vegetables that are usually boiled in water a small amount of the tenderizing powder can be sprinkled in the water before boiling commences.

The ingredients used include powdered egg shells, powdered lemon, caraway seeds and garlic salt. The mixture of these ingredients is pulverized in a grinding mill to the fineness of talcum powder for example. In such pulverized and completely mixed state the tenderizer is ready for use.

A method of manufacture that has been satisfactory consists in baking ordinary egg shells at approximately 350° F. for about one hour. Then the baked shells are pulverized to a powder. About eleven ounces of the powdered egg shells are mixed with about one-quarter of a teaspoon of caraway seed, with about one-half of a teaspoon of powdered lemon and about one-quarter of a teaspoon of garlic salt. The entire mix then is pulverized and further mixed in a grinding mill to a very finely ground mixture of approximately the consistency of talcum powder.

By actual test a teaspoon of such powder when sprinkled over one side of a one and one-quarter pound tough round steak with a like amount sprinkled on the other side of the same steak will tenderize such steak to a remarkable softness making it more edible and improving the flavor of the round steak.

When boiling vegetables that are naturally tough and hard, such as old beets, they can be softened more quickly, thus cutting down very appreciable the time usually required to soften old beets, by boiling them in water that had been first treated with the aforesaid tenderizing powder at the formula rate of one teaspoon of the powder to each quart of water used in boiling.

One of the flavoring ingredients in the tenderizer of this invention is garlic salt. It has been found that an equally excellent flavoring ingredient could be powdered garlic instead of garlic salt.

Another favorable feature of the tenedrizer of this invention is that it contains nothing spicy so that persons troubled with ulcers will not suffer any distress from its use on meats or vegetables.

Still another favorable feature of this tenderizing powder is the fact that by actual experience it does stimulate a person's appetite.

The percentage composition of the several ingredients of the tenderizer of this invention conceivably might be varied somewhat within the scope of this invention. Conceivably also the method of manufacture described herein might be changed to produce the same tenderizer. The approximate formula described herein has been actually tested and does produce the desired results described.

To produce the desirable product of this invention it is not known now what variations of the composition would be possible. Likewise how many other ways the tenderizing powder might be made has not been explored. However, the results described have been obtained with the composition stated by way of example, and also the method of manufacture described by way of example, has produced the effective tenderizer sought.

I claim as invention:

1. A food product for tenderizing meats and vegetables consisting of a very fine mixture of about eleven ounces of powdered egg shells that had been baked at about 350 degrees Fahrenheit, about one-half teaspoon of lemon powder, about one-quarter teaspoon of caraway seeds and about one-quarter teaspoon of garlic salt, which ingredients are mixed thoroughly and ground to the fineness, for example, of talcum powder.

2. A food product for tenderizing meats and vegetables consisting of a finely ground mixture of ingredients in the approximate proportions by weight of eleven ounces of powdered egg shells that had previously been baked, one-half teaspoon of lemon powder, one-quarter teaspoon of caraway seeds, and one-quarter teaspoon of garlic salt.

3. A food product for tenderizing meats and vegetables comprising a finely ground mixture of ingredients in the approximate proportions of eleven ounces of powdered egg shells that had previously been baked about one hour at 350 degrees Fahrenheit, the weight of one-half teaspoon of powdered lemon, the weight of one-quarter teaspoon of caraway seeds, and the weight of one-quarter teaspoon of garlic salt.

References Cited in the file of this patent

UNITED STATES PATENTS

| | | |
|---|---|---|
| 2,043,392 | Paddock et al. | June 9, 1936 |
| 2,140,781 | Allen | Dec. 20, 1938 |
| 2,355,548 | Musher | Aug. 8, 1944 |
| 2,553,533 | Komarik et al. | May 15, 1951 |

OTHER REFERENCES

"Food Industries," April 1948, pages 200 and 204, article entitled "Ground Shell in Dry Egg."